United States Patent

Lee

[11] 4,036,272
[45] * July 19, 1977

[54] SURE GRIP WINTER TIRE TRACTION DEVICE

[76] Inventor: Poy Lee, 52 Tennyson St., Somerville, Mass. 02145

[*] Notice: The portion of the term of this patent subsequent to Feb. 10, 1993, has been disclaimed.

[21] Appl. No.: 634,514

[22] Filed: Nov. 24, 1975

Related U.S. Application Data

[63] Continuation-in-part of Ser. No. 547,624, Feb. 6, 1975, Pat. No. 3,937,262.

[51] Int. Cl.² .................. B60C 27/00; B60C 11/14
[52] U.S. Cl. .................. 152/210; 152/179; 152/222
[58] Field of Search .............. 152/179, 210, 222; 301/44 R

[56] References Cited

U.S. PATENT DOCUMENTS 3,937,262  2/1976  Lee ........................ 152/222

Primary Examiner—Drayton E. Hoffman
Attorney, Agent, or Firm—Wolf, Greenfield & Sacks

[57] ABSTRACT

The device is for attachment to a vehicle tire to improve traction on ice or snow. The device is constructed from a circumferential segment of preferably a used tire and includes a plurality of studs extending through the tread area of the tire, one end of each stud for interlocking with the tread of the vehicle tire and the other end of the stud for gripping. In an alternate embodiment, the used tire segment is from a studded snow tire and the studs are maintained in the tire with internally extending studs being added for interlocking with the tread of the vehicle tire.

2 Claims, 5 Drawing Figures

SURE GRIP WINTER TIRE TRACTION DEVICE

RELATED APPLICATION

This is a continuation-in-part of application Ser. No. 547,624 filed Feb. 6, 1975, now U.S. Pat. No. 3,937,262 issued Feb. 10, 1976.

BACKGROUND OF THE INVENTION

The present invention relates to a traction device for attachment to one or more wheels of a vehicle. This device is easily attached to the tires of the wheel that are driven and is used for improving traction on ice or snow.

When a vehicle is stuck in snow or on a sheet or ice, in the past devices have been used to improve the traction and permit the vehicle to be moved from its stationary position. For example, a coarse mat may be carried in the vehicle and placed under the tire to provide some additional traction. The problem with this technique is that the traction is only provided instantaneously and usually the mat is forcibly expelled from contact with the tire upon rotation of the tire.

Other devices have been conceived such as short segments of chains. However, these devices are rather cumbersome to use and require a fastening arrangement to hold the device onto the tire.

Accordingly, one object of the present invention is to provide an improved traction device for use on one or more of the driven tires of the vehicle. Usually, one or both of the rear wheels are driven from the motor of the vehicle and thus the device of the present invention is preferably attached one to each rear tire unless one of the rear tires is in good frictionally engagement with a ground surface.

Another object of the present invention is to provide a traction device for attachment to a vehicle tire and which is readily attached to the tire and removed therefrom. The device of the present invention is preferably not for permanent attachment to the tire but is preferably attached only when the additional traction is necessary.

Another object of the present invention is to provide a device in accordance with the preceding object and that is preferably constructed from an old discarded tire. In this way, the device can be made quite inexpensively and the old tire is in effect recycled for further use. The used tire can also be a studded snow tire in which case the existing studs can be used and additional studs can be inserted in the internal wall of the tire.

Another object of the present invention is to provide a traction device for attachment to a vehicle tire and which is relatively simple to construct, can be sold inexpensively, and is easily stored in the vehicle when not attached to the tire of the vehicle.

SUMMARY OF THE INVENTION

To accomplish the foregoing and other objects of this invention, there is provided a device for attachment to a vehicle tire to improve the traction of the tire with a surface upon which the tire rests such as a normal ground surface. The device may be for attachment to one or both of the rear wheels of a vehicle. The device generally comprises an arcuate segment of a tire which is preferably a used discarded tire. The segment of the tire is usually cut from a tire which is larger in size than the vehicle tire to which the segment is to be attached so that the device fits properly over the vehicle tire. A plurality of studs are provided, each having opposite ends and preferably also including an intermediate flange. The tire segment has means for receiving one end of the stud and means are usually provided for holding the stud in a fixed position in the segment with the other end of the stud extending inwardly of the inner surface of the tire segment. With the stud essentially extending in both directions from the tire the outer end of the stud is used for gripping the road surface and the inner end of the stud is adapted to fit within the vehicle tire tread so that the device is held in place.

In accordance with the method of the present invention, the device can be constructed in one of two ways. The stud can be pierced through the old tire and a liner can be inserted inside the tire to hold the stud in place. In the preferred embodiment the stud is also inserted through the tire and the outer surface of the tire is recapped in a well known manner.

In accordance with the teachings of this invention, a used studded tire can also be used for constructing the device. In this case the existing studs on the outer surface of the casing are left in the tire. A plurality of additional studs are added on the internal surface of the casing and may be held in the casing by preformed passages which receive these additional studs.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
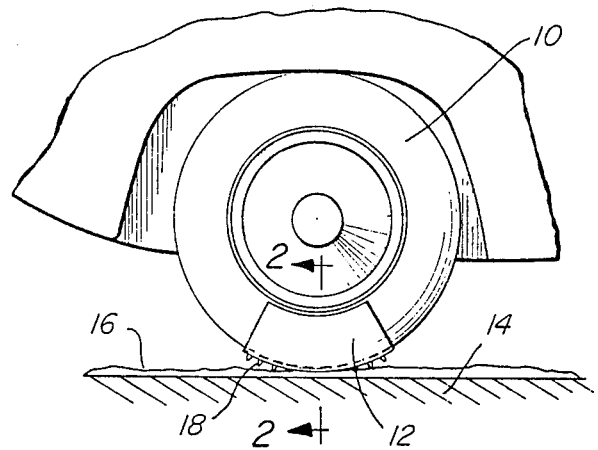
FIG. 1 shows the device of the present invention attached to a vehicle tire.

FIG. 1 shows a vehicle tire 10 having the device 12 of the present invention attached thereto. The tire 10 is resting upon a ground surface 14 that may have a cover of ice or snow 16 thereover. In FIG. 1 there is shown a series of studs 18 extending from the device 12 which provide additional gripping as the tire rotates to improve traction between the tire and the ground surface.

Figure 2:
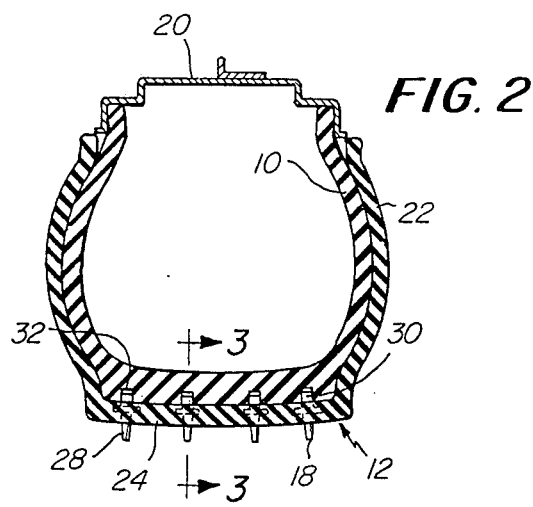
FIG. 2 is a cross-sectional view taken along line 2—2 of FIG. 1.

FIG. 2 is a cross-sectional view taken along line 2—2 of FIG. 1 and shows the tire rim 20 which is typically constructed of metal and the vehicle tire 10. The device 12 substantially surrounds the tire 10 as shown in FIG. 2 but only extends for a segmented portion of the tire.

The device 12 is preferably constructed from a discarded tire and is preferably selected to be slightly larger than the vehicle tire. For example, if the vehicle tire is an E78-14 then the tire from which the device 12 is constructed may be a G78-14 tire. Typically, about six segments may be cut from an old tire to provide six separate segments.

As indicated in FIG. 2, the tire segment 12 includes a sidewall 22 and a tread area 24. A plurality of studs 18 are disposed in the tread area 24. Each of these studs includes a bottom end 28 for gripping with the road surface as indicated in FIG. 1 and a top end 30 which is mated with the tread 32 in the vehicle tire 10. It is this mating of the top end of the studs into the existing tire tread that provides a locking action of the device to the vehicle tire 10.

Figure 3:
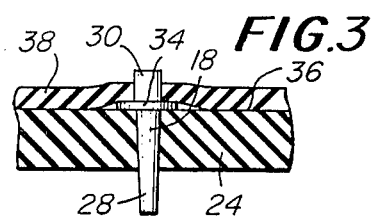
FIG. 3 is a cross-sectional view taken along line 3—3 of FIG. 3 but without showing the vehicle tire.

FIG. 3, which is a cross-sectional view through one embodiment of the invention shows the stud 18 with its top end 30 and its bottom end 28. FIG. 3 also shows the tread area 24 which may be provided with a passage for accommodating the stud 18. This stud also includes a flange 34. In accordance with one method of constructing the device of this invention, the stud 18 is passed through the tread area 24 until the flange 34 hits the inner surface 36. A liner 38 is then fitted within the segment 12. This liner may be glued in place within the tire and is sadpated to hold all of the studs in place. It is noted in FIG. 3 that the top end 30 of the stud extends above the liner 38 so that this end can mate with the tread in the tire 10 thereby providing the interlocking previously mentioned.

Figure 4:
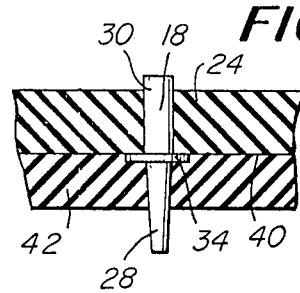
FIG. 4 shows an alternate arrangement for holding the stud in place in the device.

In accordance with another method which is a preferred method of holding the studs in place, reference is now made to FIG. 4. There is shown in FIG. 4 the stud 18 with its ends 30 and 28. FIG. 4 also shows the tread area 24 of the device. In accordance with this method of construction the stud 18 is passed through a passage or is pierced through the tread area 24 at the proper position. The flange 34 then rests upon the outer surface 40. Thereafter, a rubber layer or synthetic layer 42 is recapped onto the tire and is dimensioned so that the lower end 29 of the stud extends sufficiently down as shown in FIG. 4 to provide sufficient gripping action.

It is noted in FIGS. 3 and 4 that the stud preferably has a straight top section and a tapered lower section. The stud may be either square, rectangular or circular in cross-section.

Figure 5:
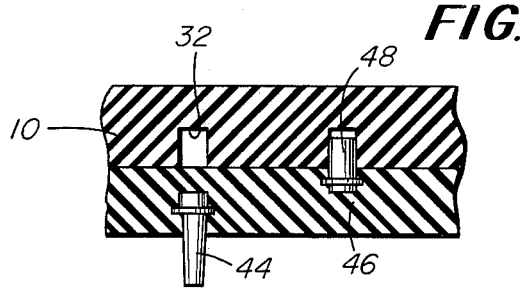
FIG. 5 is a cross-sectional view showing an alternate embodiment employing a studded tire.

FIG. 5 is a cross-sectional view of still another embodiment of the invention showing the vehicle tire 10 with a single recess or channel in the tread for receiving the stud 48. The stud 48 may be of cylindrical shape and have a flanged bottom for securing the stud 48 in the tread area 46 of the device of this invention. The device may have a cylindrical passage in the tread area in the internally facing wall for receiving the stud 48 which may be inserted by force into this cylindrical passage.

It is noted that the cross-sectional view of FIG. 5 also shows the existing stud 44. This existing stud was inserted into the tread area 46 of the used tire when the tire was new. The stud 44 is typically inserted into an accommodating hole by means of an impact device. Again, the stud 44 may have a flanged top as viewed in FIG. 5 for securing the stud 44 in place in the tread area 46. Although in FIG. 5 only one stud 44 and one stud 48 are shown, it is obvious that there are a plurality of both of these studs. The studs 44 provide the traction and the studs 48 assist in holding the device to the vehicle tire 10.

Having described a limited number of embodiments of the present invention, it should now become apparent to those skilled in the art that there are numerous other embodiments and modifications of the embodiments disclosed herein, all of which are contemplated as falling within the spirit and scope of the present invention.

What is claimed is:

1. A device for attachment to a vehicle tire to improve traction of the tire with a surface upon which the tire rests, said device comprising an arcuate segment of a studded tire which is of a size that permits the segment to be attached to the vehicle tire and has a plurality of studs embedded in the segment with one end of the studs extending radially outwardly of the segment, a second plurality of studs also embedded in the segment and means for holding the studs of the second plurality of studs in the segment with one end of the studs extending radially inwardly of the inner surface of the segment.

2. A device for attachment to a vehicle tire to improve traction of the tire with a surface upon which the tire rests, said device comprising an arcuate segment of a tire that is constructed to snugly attach to the vehicle tire, a first plurality of studs each having opposite ends, said segment having means for receiving each stud with the stud embedded in the segment and with one end of the stud extending radially outward of the vehicle tire, a second plurality of studs embedded in the segment and means for holding the studs of the second plurality of studs in the segment with one end of the studs extending radially inward of the inner surface of the tire segment.

* * * * *